WARREN R. SCHACK
EUGENE G. SCHMOLLER
THOMAS K. SHANKS
PHILIP C. METZLER
INVENTORS.

BY ETMcCabe

ATTORNEY.

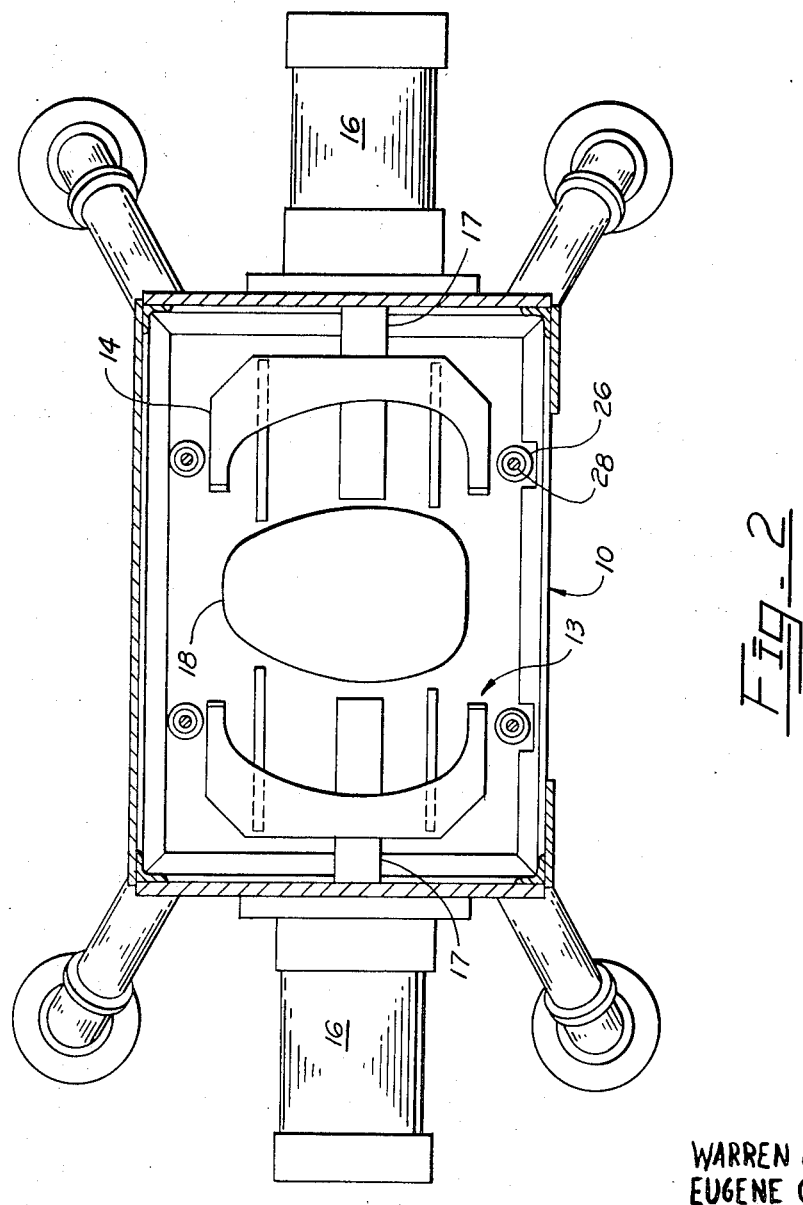

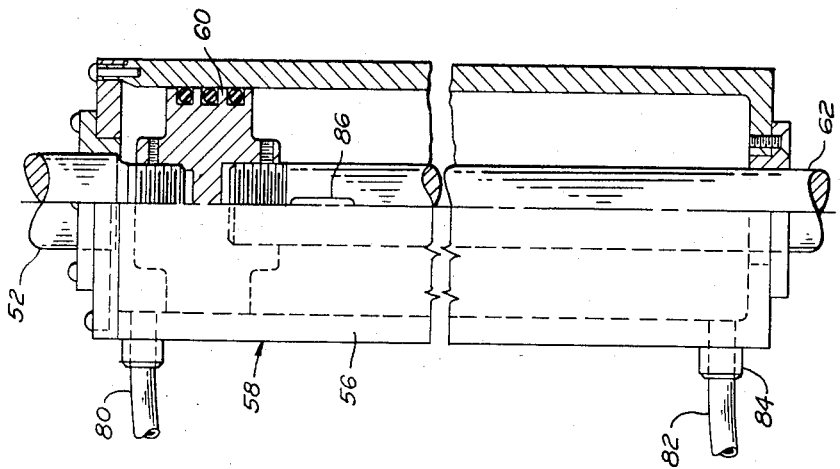
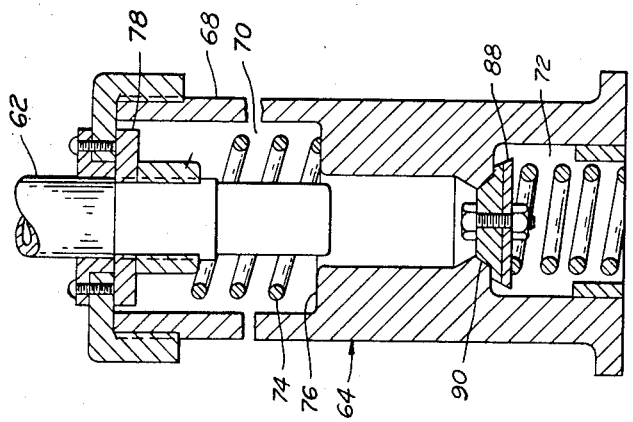

United States Patent Office 3,565,639
Patented Feb. 23, 1971

3,565,639
METHOD FOR CURING MEAT
Warren R. Schack, Western Springs, Eugene G. Schmoller, Palos Heights, and Thomas K. Shanks, Chicago, Ill., and Philip C. Metzler, Orange, Calif., assignors to Swift & Company, Chicago, Ill., a corporation of Delaware
Filed Dec. 11, 1967, Ser. No. 689,721
Int. Cl. A23b 1/01
U.S. Cl. 99—159
6 Claims

ABSTRACT OF THE DISCLOSURE

Method of pickling a meat product comprising exerting a compressive force upon the meat product within a container and subsequently reducing the force to a lower positive pressure and thereupon injecting the meat with pickle solution. Apparatus for performing the method comprising positive pressure exerting assembly in combination with an assembly operable to meter desired quantities of pickle and inject the pickle into the meat product.

---

This invention relates to an improved method and apparatus for the rapid shaping and curing of meat, and more specifically relates to a method and apparatus for injecting curing pickle into meat products while the products are held under a compressive force, preferably within a confinement having the volume and shape of an ultimate container.

The curing of meat products primarily involves action upon the lean, rather than the fat, and conventionally it comprises subjecting the lean to the action of a salt composition including sodium chloride and a nitrogen-containing curing salt which is usually a mixture of nitrite and nitrate of alkali metal. In many cases this is followed by smoking. In the case of fatty pieces of meat, the lean is hidden or buried by fat, calling for prolonged curing procedures in order to have the curing material pass through the fat to reach the lean. Also the curing process is very often associated with preceding or subsequent shaping operations necessary to turn out a completed product such as bacon, cottage hams, loaf meat items and certain canned whole meat items such as canned hams.

In some curing processes the curing material, or pickle, is injected into the body of meat. Present method of injecting pickle into meats include artery pumping and stitch pumping. In artery pumping, which generally applies to hams, the pickle is distributed by being injected through needles manually inserted into the arteries of a green ham. However, there are several disadavntages to this method of curing hams. One difficulty is that the distribution of pickle throughout the ham is not uniform due to rupturing of the arterial system prior to or during pumping. Another disadvantage is the great amount of time expended in manually handling the hams.

In stitch pumping, one or more needles are connected to a common header, which in turn is connected to a source of pickle under pressure, and these needles are inserted into the meat. However, an uneven distribution of pickle throughout the meat usually results from employing this method. It is especially difficult to attain a uniform distribution of pickle throughout the meat in the direction of penetration of the needles, as the needles usually do not inject pickle until they have passed into the center of the meat. Due to this poor distribution of pickle, the meat frequently is held for two to five days to allow time for diffuusion of the pickle to all parts of the meat. The disadvantages of such a process are apparent: loss of time and/or gain during the extensive curing of the meat and the requirement of large storage facilities.

Further disadvantages arise from the separate shaping process often required and entailing additional handling and processing time. Obviously advantages would accrue if the curing and shaping processes could be combined or conducted simultaneously.

Accordingly, it is a principal object of this invention to provide an improved method and apparatus for the curing of meat with pickle solution.

Another object of this invention is to provide an improved method and apparatus to effect a substantially uniform distribution of pickle throughout a meat product in a short length of time.

A further object of this invention is to provide an improved method and apparatus for injecting pickle into meat while the meat is held under a compressive force.

Still another object of this invention is to provide an improved method and apparatus for combining the shaping of a meat item by compression and the injection of pickle into the meat while held under a positive pressure.

A still further object of the invention is to provide an improved method and apparatus for shaping and curing a meat item directly in the ultimate container.

Yet another object of this invention is to provide an improved apparatus for metering selected quantities of pickle for injection into a meat product.

Generally, the present invention comprises a method for injecting pickle solution into meat to effect the rapid cure of the meat. The inventive method involves applying a compressive force to a meat product in order to eliminate air pockets in the meat and to effect muscle-to-muscle contact within the meat, and then reducing the force to a lower positive pressure. Subsequently, a plurality of injection needles are moved to penetrate the meat product and a metered amount of pickle is injected into the meat product while being held under the lower positive pressure. Thereafter the pressure is completely released and the needles withdrawn. In this manner, a uniform distribution of pickle may be attained throughout the product. The foregoing steps are undertaken on a body of meat held within a confinement having the shape and volume of a container intended to enclose the product and preferably the confinement is the ultimate container.

In general, the curing apparatus comprises a compressing means for sequentially exerting a variable compressive force on the meat product and for co-operating with forming means to shape and confine the meat product, and injector means for injecting a metered amount of pickle into the compressed meat product. A novel injector assembly which may advantageously be used in the curing apparatus includes a plurality of injection needles, a valve means, and a proportioning pump. The proportioning pump meters a uniform volume of pickle to the injection needles upon every downward stroke of the needles into and through the meat product.

Other objects and advantages of the invention will become apparent from the following description and explanation of the invention as set forth in reference to the accompanying drawings, wherein:

FIG. 2 is a section view taken along line 2—2 of FIG. 1;

FIG. 3 is an elevation view in partial section of a portion of the apparatus of FIG. 1; and FIG. 4 is an elevation view in section of another portion of the apparatus of FIG. 1.

Figure 1:
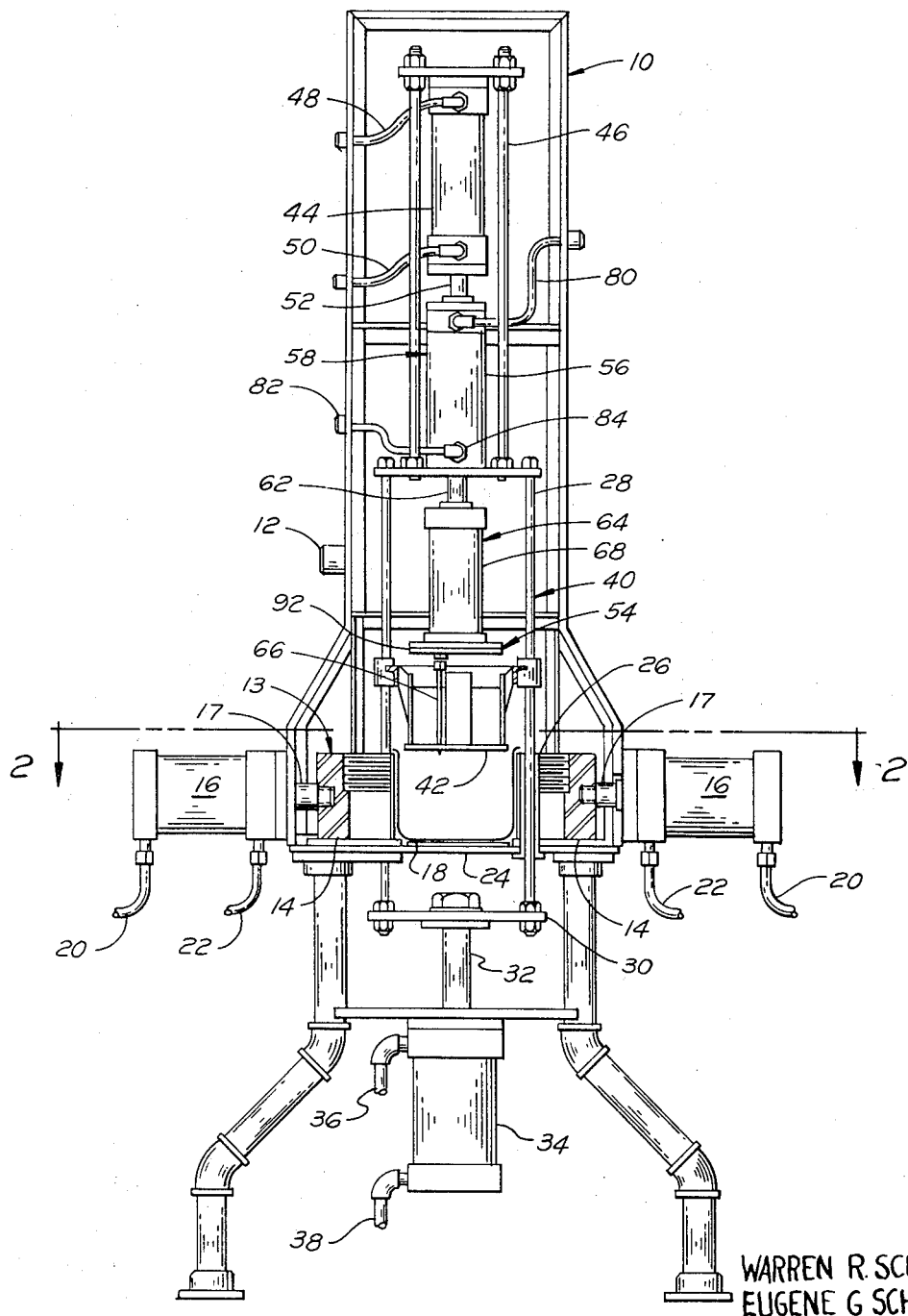
FIG. 1 is a front elevation partly in section of an apparatus of one embodiment of the present invention for injecting pickle into meat placed within a container such as a can.

The method of the present invention comprises first applying a relatively great compressive force to shape an uncured meat item to conform with a container, such as an open can. When producing a canned ham, for instance, it is necessary to place a deboned thigh, having a bone cavity, and one or more additional lean meat pieces in a can and then compress same. The pressure for accomplishing this step is between about 30 p.s.i. and 150 p.s.i. and is preferably about 75 p.s.i. applied to the top of the meat. The pressure applied must be sufficient to eliminate air pockets from the meat product and from between the product and container, and to cause good muscle-to-muscle contact within the meat. The pressure should not be so great as to damage the meat or expel the natural juices therefrom; nor so low as to be insufficient to eliminate voids. Also, it will usually be necessary to apply a confining force to the exterior of the container, during compression of the meat, so as to retain the specific shape and volume and to avoid damage to the container. Meat products containing a higher percentage of fat should be subjected to a relatively lower pressure; also, flacid meat, such as at warm temperatures, requires less compressive force to eliminate voids and air pockets.

By eliminating the air pockets within a meat product, the curing solution subsequently introduced tends to diffuse more uniformly throughout the product, rather than collecting in the voids to create areas of high pickle concentration and alternate areas of low pickle concentration. Accordingly, it is also preferred to evacuate the area of the container just prior to, and during the compression step. Immediately after compression it is necessary to reduce the compressive force applied to the meat product to a lesser superatmospheric pressure so as to enable injection of pickle solution. Otherwise the counter pressures within the meat product would require an exceedingly great fluid injection pressure to overcome same. Also, the reduction of pressure prior to injection promotes better dicusion of pickle throughout the meat during injection thereof. In this condition the pickling fluid is injected at multiple points while a positive holding pressure between about 1 p.s.i. and 30 p.s.i. and preferably about 10 p.s.i. is maintained on the meat product during injection so as to maintain the meat compacted and of even depth. Subsequent further reduction of pressure from the holding pressure to atmospheric, after injection, has been found to have a further beneficial effect upon the ultimate distribution of solution throughout the meat and appears to lessen the tendency for pickling fluid to leak from the injection sites.

Preferably pickle injection is by a plurality of spaced injection needles. The needles are preferably advanced through the thickness of the meat product at a uniform linear rate of speed, and a metered flow of pickle is simultaneously injected at an even rate to allow uniform distribution throughout the meat product. The flow of pickle continues as long as the needles are moving through the product, but may be shut off during the retraction stroke of the needles. The pickling solution must be injected into the meat product at a pressure greater than the positive pressure held upon the meat during the injection.

Finally, the injection needles are fully withdrawn and the holding pressure is released from the meat surface. If the process has been conducted in an evacuated space, the vacuum is released. Thereafter, the meat is sealed within the desired container and heat processed therein to provide the desired pasteurization or sterilization in conventional manner. Curing of the meat is completed substantially entirely within the sealed container.

All green meat cuts are contemplated as being suitable for rapid curing by the present process. The treatment of hams by this process is especially effective and advantageous as canned ham is a highly desirable product.

FIGS. 1 and 2 illustrate as apparatus especially adapted to assemble and cure a canned boneless ham product. The apparatus includes a housing generally 10 having a connection 12 through which the enclosure therein may be evacuated by a vacuum means, not shown. A forming means generally 13 includes a pair of forms 14 having the curvature of a familiar "pear shaped" can mounted within the housing 10 and each connected to one of a pair of hydraulic drive cylinders 16 having drive rods 17 operable to move the forms 14 transversely into and out of embracing contact with the sides of an open top confinement member such as a can 18. Drive cylinders 16 are connected to suitable valving and a source of hydraulic fluid under pressure (not shown) by means of cylinder couplings and hydraulic lines 20 and 22. The can 18 is supported upon a stationary horizontal support plate 24 rigidly mounted transversely of the housing 10 and below the forms 14. The plate also supports four bearings 26 outwardly of the forms 14 in which an equal number of shafts 28 are vertically reciprocable within the housing 10. Shafts 28 are connected by a yoke 30 beneath the plate 24 to a power source such as a drive shaft 32 of a hydraulic compressing cylinder 34 rigidly mounted beneath the housing 10. Compressing cylinder 34 is connected to a source of hydraulic fluid under pressure (not shown) by couplings and hydraulic lines 36 and 38. The shafts 28 and compressing cylinder 34 comprise a compressing means generally 40 along with a perforated pan 42 fixed to the shafts 28 a distance above support plate 24. The pan 42 is of a shape and size to telescope closely within the can 18 so as to press the meat therein on the downstroke of the compressing cylinder 34. A pressure relief valve (not shown) is manually connectable to hydraulic line 36 to allow the compressive pressure to be reduced after an initial compression of material in the can 18.

An upper hydraulic cylinder 44 is rigidly mounted within a frame 46 fixed to the upper ends of shafts 28. Couplings and hydraulic lines 48 and 50 connect the upper cylinder 44 to a source of hydraulic fluid under pressure (now shown). The cylinder 44 includes a piston rod 52 mounted for reciprocable vertical motion to drive an injector assembly generally 54, hereinafter described, toward the can 18.

The piston rod 52 passes from the lower end of the upper cylinder 44 and through one end of an exchangeable canister 56 of a pickle proportioning pump generally 58, which is rigidly mounted within the frame 46 below the upper cylinder 44. The piston rod 52 is rigidly attached to one side of a pump plunger 60 slidably fitted within the canister 56 (details of which are shown in FIG. 3) and in sealing contact therewith. A hollow shaft 62 extends from the opposite side of the plunger 60 through the lower end of the canister 56 and to the aforementioned injector assembly generally 54. The assembly generally 54 is rigidly attached to the hollow shaft 62 to be vertically reciprocated thereby above the perforated pan 42.

The injector assembly generally 54 includes a valve generally 64 and a plurality of hollow needles 66 corresponding in number and location to the perforations in pan 42. The valve generally 64, as shown in FIG. 4, includes a casing 68 having upper and lower compartments 70 and 72 respectively. The hollow shaft 62, which slidably extends a short distance into the upper valve compartment 70, is connected to the valve casing 68 by a compression spring 74 positioned within compartment 70 and resting on a seat 76. Shaft 62 has a shoulder 78 radially fixed thereon which engages spring 74 upon the downward stroke of shaft 62, and engages the valve cap upon the upward stroke. This construction allows for a slight lag between movement of the shaft 62 and corresponding movement of the injector assembly generally 54. Thus compression of spring 74 by the downward stroke of hollow shaft 62 allows a slight delay in needle penetration while pressure comes up in the injector assembly; and retraction of the needles 66 upon the upward stroke of hollow shaft 62 is delayed until pressure drops, as shoulder 78 must again abut the upper end of compartment 70 before the valve generally 64 and needles 66 will be raised.

Pickle fluid is forced into the upper compartment 70 of the valve casing 68 when piston rod 52 of upper hydraulic cylinder 44 is forced downwardly, because the same downward motion will cause the pump plunger 60 of proportioning pump generally 58 to also move downwardly within the canister 56 which is fixed in relation to the upper hydraulic cylinder 44. Thus it will be seen that for each increment of movement applied to the injector assembly generally 54, a proportional volume of pickle fluid will be expelled from the canister 56. It follows that even amounts of pickle fluid will be expelled through the needles 66 into a meat product throughout each increment of movement and, hence, penetration.

The ratio of fluid volume to linear movement may be adjusted by exchanging the canister 56 for units of greater or lesser diameter. Similarly the plunger 60 must also be exchanged to match a given canister 56. Furthermore, it will be noted in FIG. 3 that the canister 56 is provided with a vent line 80 communicating between the space above the plunger 60 and the exterior of the housing 10. Also, a pickle supply line 82 is connected between an exterior source of supply (not shown) and the lowermost portion of the canister 56. A check valve 84 is mounted on the canister 56 at the pickle supply conduit 82 so as to prevent back flow of fluid when the plunger 60 is forced downwardly.

During downward motion, pickle fluid is limited to discharge from the pump generally 58 only through a port 86 in the hollow shaft 62 located just beneath the plunger 60. Pickle fluid will thus be forced through the hollow shaft 62 into the upper compartment 70 of the valve generally 64. It is then forced into the lower compartment 72 past a spring biased check valve 88 normally positioned in a wall 90 between the two compartments. The spring biased check valve 88 is selected to require a fluid pressure in excess of the positive pressure designed to be held on the meat product in can 18 for it to open. Thus fluid will not flow to the lower compartment 72 and thence through a manifold 92 to the needles 66 until the entire injector assembly generally 54 has been moved a slight distance downwardly, sufficient both to build fluid pressure and to pass the needles 66 through the perforations in pan 42 and slightly into the meat product.

The downstroke of the injector assembly generally 54 is limited to the length of the needles as the manifold 92 will then engage the fixed pan 42 and motion of the hollow shaft 62 will be stopped. A suitable pressure sensitive switch may be incorporated in the hydraulic control circuit (not shown) to shift the flow of hydraulic fluid from the upper portion of cylinder 44 to the lower portion thereof, upon the termination of the downward stroke of hollow shaft 62. When the plunger 60 comes to rest in canister 56, pressure on the pickle fluid will drop and the spring biased check valve 88 will close, preventing discharge of fluid on the upstroke of hollow shaft 62. Also on the upstroke, the check valve 84 on canister 56 will open, providing a resupply of pickle to the canister 56. Since the compression spring 74 allows a slight delay in retraction of the needles 66 upon the upward stroke of hollow shaft 62, the pickle pressure will decrease below the injection pressure and check valve 88 will close before the needles 66 are removed from the meat product. Thus drippage of pickle upon withdrawal of needles 66 is prevented.

After retraction of the needles 66, the perforated pan 42 is withdrawn from contact with the meat product in can 18 by reversing the flow of hydraulic fluid in compressing cylinder 34. Also, the forms 14 are moved out of contact with can 18 by reversing the flow of hydraulic fluid in drive cylinders 16. Thereafter, the housing 10 may be vented to atmospheric pressure through connector 12, and the can 18 containing the meat product removed. A new can and meat product may then be positioned on support plate 24.

The foregoing detailed description of the invention is intended to clarify the purpose of subject method and apparatus and is not intended to limit applicants to the exact details of construction shown and described. It is obvious that certain modifications of the invention will occur to a person skilled in the art.

We claim:

1. An improved method of curing meat products comprising: applying a compressive force of from about 30–150 p.s.i. to said meat to shape same and eliminate air pockets therein; reducing said compressive force to a lower positive pressure of about 1–30 p.s.i.; injecting a metered amount of pickling solution substantially uniformly throughout the depth of said meat while holding said meat under said positive pressure; and releasing said positive pressure after said injecting.

2. An improved method for shaping a meat product and injecting substantially equal amounts of curing pickle throughout the thickness thereof to effect a rapid cure, said method comprising the steps of: placing the meat in an open top confinement; applying a compressive force of greater than 30 p.s.i. but less than the pressure which would damage the meat to the upper surface of said meat to eliminate air pockets therein and to conform said meat to said confinement; reducing said compressive force to a lower superatmospheric pressure less than 30 p.s.i., which lower pressure is sufficient to allow expansion of said meat product while preventing reforming of said air pockets penetrating the upper surface of said product with a plurality of spaced injection needles by movement of said needles relative to said meat product; concurrently injecting a metered flow rate of pickle into said product while held under said lower positive pressure and proportional to travel of said needles through said meat product; and then completely releasing said compressive force.

3. The method of claim 2 wherein the confinement into which said meat is placed is a container intended to ultimately enclose said meat.

4. The method of claim 2 wherein said meat product is a boned green ham, and wherein said ham is placed in an open top can prior to the application of said compressive force, and wherein the can is hermetically sealed subsequent to injection of pickle.

5. The method of claim 4 wherein the steps of applying a compressive force to the ham, reducing said compressive force to a lower positive pressure, and injecting pickle into the ham are carried out in a vacuum.

6. The method of claim 4 wherein a compressive force of about 30–150 p.s.i. is applied to the ham and wherein this compressive force is reduced to a lower positive pressure of about 1–30 p.s.i. prior to penetration of said needles into said product.

References Cited

UNITED STATES PATENTS

| | | | |
|---|---|---|---|
| 2,742,367 | 4/1956 | Bacbert | 99—159 |
| 2,821,901 | 2/1958 | Abram's | 99—257 |
| 3,006,767 | 10/1961 | Huckabee | 99—159X |
| 3,114,644 | 12/1963 | Peterson | 99—187 |
| 3,334,570 | 8/1967 | Nordin et al. | 99—257 |
| 3,338,150 | 8/1967 | Nordin | 99—257 |

JOSEPH M. GOLIAN, Primary Examiner

U.S. Cl. X.R.

99—187, 255, 256